(12) United States Patent
Singh

(10) Patent No.: US 11,391,826 B2
(45) Date of Patent: Jul. 19, 2022

(54) VEHICLE LIDAR SENSOR CALIBRATION SYSTEM

(71) Applicant: Magna Electronics Inc., Auburn Hills, MI (US)

(72) Inventor: Jagmal Singh, Aschaffenburg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 848 days.

(21) Appl. No.: 16/143,758

(22) Filed: Sep. 27, 2018

(65) Prior Publication Data
US 2019/0094347 A1 Mar. 28, 2019

Related U.S. Application Data

(60) Provisional application No. 62/563,737, filed on Sep. 27, 2017.

(51) Int. Cl.
*G01S 7/48* (2006.01)
*G01S 7/497* (2006.01)
*G01S 17/931* (2020.01)

(52) U.S. Cl.
CPC .......... *G01S 7/4972* (2013.01); *G01S 17/931* (2020.01)

(58) Field of Classification Search
USPC ........................................................ 356/4.01
See application file for complete search history.

(56) References Cited

U.S. PATENT DOCUMENTS

| | | | |
|---|---|---|---|
| 5,835,203 A | * | 11/1998 | Ogura .................... G01S 17/87 356/5.01 |
| 5,949,331 A | | 9/1999 | Schofield et al. |
| 6,587,186 B2 | | 7/2003 | Bamji et al. |
| 6,674,895 B2 | | 1/2004 | Rafii et al. |
| 6,678,039 B2 | | 1/2004 | Charbon |
| 6,690,354 B2 | | 2/2004 | Sze |
| 6,710,770 B2 | | 3/2004 | Tomasi et al. |
| 6,825,455 B1 | | 11/2004 | Schwarte |
| 6,876,775 B2 | | 4/2005 | Torunoglu |
| 6,906,793 B2 | | 6/2005 | Bamji et al. |
| 6,919,549 B2 | | 7/2005 | Bamji et al. |
| 7,053,357 B2 | | 5/2006 | Schwarte |
| 7,157,685 B2 | | 1/2007 | Bamji et al. |
| 7,176,438 B2 | | 2/2007 | Bamji et al. |
| 7,203,356 B2 | | 4/2007 | Gokturk et al. |

(Continued)

FOREIGN PATENT DOCUMENTS

WO 2011090484 A1 7/2011

*Primary Examiner* — James R Hulka
(74) *Attorney, Agent, or Firm* — Honigman LLP

(57) ABSTRACT

A calibration system for calibrating a LIDAR sensing system of a vehicle includes a plurality of light reflecting targets disposed at a ground surface at an end of line calibration region of a vehicle assembly facility. The light reflecting targets are arranged at the ground surface in a predetermined pattern. When a vehicle equipped with a LIDAR sensing system is at the calibration region, the light reflecting targets are in the field of sensing of at least one LIDAR sensor of the LIDAR sensing system of the vehicle. Responsive to processing of data sensed by the at least one LIDAR sensor, the calibration system determines the locations of the light reflecting targets and determines misalignment of the LIDAR sensor and calibrates the LIDAR sensing system to accommodate the determined misalignment.

19 Claims, 6 Drawing Sheets

(56) References Cited

U.S. PATENT DOCUMENTS

| | | | |
|---|---|---|---|
| 7,212,663 B2 | 5/2007 | Tomasi | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 8,013,780 B2 | 9/2011 | Lynam | |
| 8,027,029 B2 | 9/2011 | Lu et al. | |
| 8,218,024 B2* | 7/2012 | Kawata | G01S 17/86 348/222.1 |
| 9,036,026 B2 | 5/2015 | Dellantoni et al. | |
| 9,146,898 B2 | 9/2015 | Ihlenburg et al. | |
| 9,575,160 B1 | 2/2017 | Davis et al. | |
| 9,599,702 B1 | 3/2017 | Bordes et al. | |
| 9,689,967 B1 | 6/2017 | Stark et al. | |
| 9,734,699 B2* | 8/2017 | Wassef | B60Q 9/008 |
| 9,753,121 B1 | 9/2017 | Davis et al. | |
| 9,963,106 B1* | 5/2018 | Ricci | B60W 50/14 |
| 10,082,562 B1* | 9/2018 | Abari | G01S 13/325 |
| 10,120,076 B2* | 11/2018 | Scheim | G01S 17/931 |
| 10,175,340 B1* | 1/2019 | Abari | G06K 9/00805 |
| 10,281,581 B2* | 5/2019 | Lipson | H04B 10/1123 |
| 10,306,430 B1* | 5/2019 | Abari | H04W 4/44 |
| 2006/0164295 A1 | 7/2006 | Focke | G01S 13/867 342/174 |
| 2007/0179690 A1* | 8/2007 | Stewart | G01C 21/00 701/23 |
| 2010/0238291 A1* | 9/2010 | Pavlov | B60R 11/04 348/148 |
| 2010/0245066 A1 | 9/2010 | Sarioglu et al. | |
| 2012/0290169 A1* | 11/2012 | Zeng | G01S 7/4972 701/30.2 |
| 2014/0233023 A1* | 8/2014 | Soininen | G01S 13/867 356/138 |
| 2014/0368651 A1* | 12/2014 | Irschara | G06T 7/80 348/148 |
| 2015/0088373 A1* | 3/2015 | Wilkins | G05D 1/0234 701/36 |
| 2016/0161602 A1* | 6/2016 | Prokhorov | G01S 7/4026 702/97 |
| 2016/0306032 A1* | 10/2016 | Schwarz | G01S 7/4812 |
| 2016/0364864 A1* | 12/2016 | Irschara | H04N 5/23238 |
| 2017/0222311 A1 | 8/2017 | Hess et al. | |
| 2017/0254873 A1 | 9/2017 | Koravadi | |
| 2017/0276788 A1 | 9/2017 | Wodrich | |
| 2017/0315231 A1 | 11/2017 | Wodrich | |
| 2017/0343654 A1* | 11/2017 | Valois | G01S 7/497 |
| 2017/0356994 A1 | 12/2017 | Wodrich et al. | |
| 2018/0015875 A1 | 1/2018 | May et al. | |
| 2018/0045812 A1 | 2/2018 | Hess | |
| 2018/0067198 A1* | 3/2018 | Valois | G01S 17/08 |
| 2018/0154906 A1* | 6/2018 | Dudar | B60R 21/0136 |
| 2018/0196127 A1* | 7/2018 | Harada | G08G 1/161 |
| 2018/0231635 A1 | 8/2018 | Woehlte | |
| 2018/0231654 A1* | 8/2018 | Bilik | G01S 13/865 |
| 2018/0232947 A1* | 8/2018 | Nehmadi | G01S 17/931 |
| 2018/0276910 A1* | 9/2018 | Pitt | G07C 5/08 |
| 2018/0284231 A1* | 10/2018 | Russell | G01S 17/42 |
| 2018/0284245 A1* | 10/2018 | LaChapelle | G01S 17/42 |
| 2018/0299533 A1* | 10/2018 | Pliefke | G01S 7/40 |
| 2018/0354383 A1* | 12/2018 | Namou | B60L 53/124 |
| 2018/0356526 A1* | 12/2018 | Wang | G01S 17/86 |
| 2018/0361918 A1* | 12/2018 | Bertollini | B60Q 5/005 |
| 2019/0056483 A1* | 2/2019 | Bradley | G01S 7/4972 |
| 2019/0056484 A1* | 2/2019 | Bradley | G01S 17/42 |
| 2019/0111842 A1* | 4/2019 | Batur | B60T 7/22 |
| 2019/0178998 A1* | 6/2019 | Pacala | G01C 21/20 |
| 2019/0179029 A1* | 6/2019 | Pacala | G01S 7/4808 |
| 2019/0179320 A1* | 6/2019 | Pacala | G08G 1/166 |
| 2019/0187249 A1* | 6/2019 | Harmer | F16M 11/242 |
| 2019/0204425 A1* | 7/2019 | Abari | G01S 13/931 |
| 2019/0204427 A1* | 7/2019 | Abari | G01S 17/931 |
| 2019/0232954 A1* | 8/2019 | Cinpinski | B60W 40/10 |
| 2019/0331774 A1* | 10/2019 | Jackson | G01S 7/4817 |
| 2019/0339382 A1 | 11/2019 | Hess et al. | |
| 2020/0249353 A1* | 8/2020 | Di Cicco | G01S 17/894 |
| 2020/0353839 A1* | 11/2020 | Tarchinski | B60L 55/00 |

\* cited by examiner

VEHICLE LIDAR SENSOR CALIBRATION SYSTEM

CROSS REFERENCE TO RELATED APPLICATION

The present application claims the filing benefits of U.S. provisional application Ser. No. 62/563,737, filed Sep. 27, 2017, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle to provide a field of sensing at or around the vehicle.

BACKGROUND OF THE INVENTION

Use of imaging sensors or ultrasonic sensors or RADAR sensors or LIDAR sensors in vehicle sensing systems is known. Examples of such known systems are described in U.S. Pat. No. 8,013,780 and/or 5,949,331 and/or U.S. publication No. US-2010-0245066 and/or International Publication No. WO 2011/090484, which are hereby incorporated herein by reference in their entireties.

SUMMARY OF THE INVENTION

The present invention provides enhanced calibration of a driver assistance system or sensing system of a vehicle. The calibration system functions to calibrate a sensor module or system disposed at the vehicle and comprising at least one LIDAR sensor disposed at the vehicle and having a field of sensing exterior of the vehicle. The calibration system includes a plurality of light reflecting targets disposed at a ground surface at an end of line calibration region of a vehicle assembly facility, with the light reflecting targets arranged at the ground surface in a predetermined pattern. When a vehicle equipped with a LIDAR sensing system is at the calibration region, the light reflecting targets are in the field of sensing of at least one LIDAR sensor of the LIDAR sensing system of the vehicle. Responsive to processing of data sensed by the at least one LIDAR sensor, the calibration system determines the locations of the light reflecting targets and calibrates the LIDAR sensing system. The calibration system may also include a vertically oriented target with a pattern of markers thereat. The calibration system calibrates the pitch, roll and yaw of the LIDAR sensing system at the end of line (EOL) of the vehicle assembly plant, such that further calibration is not needed after the vehicle leaves the assembly plant.

These and other objects, advantages, purposes and features of the present invention will become apparent upon review of the following specification in conjunction with the drawings.

DESCRIPTION OF THE PREFERRED EMBODIMENTS

Figure 1:
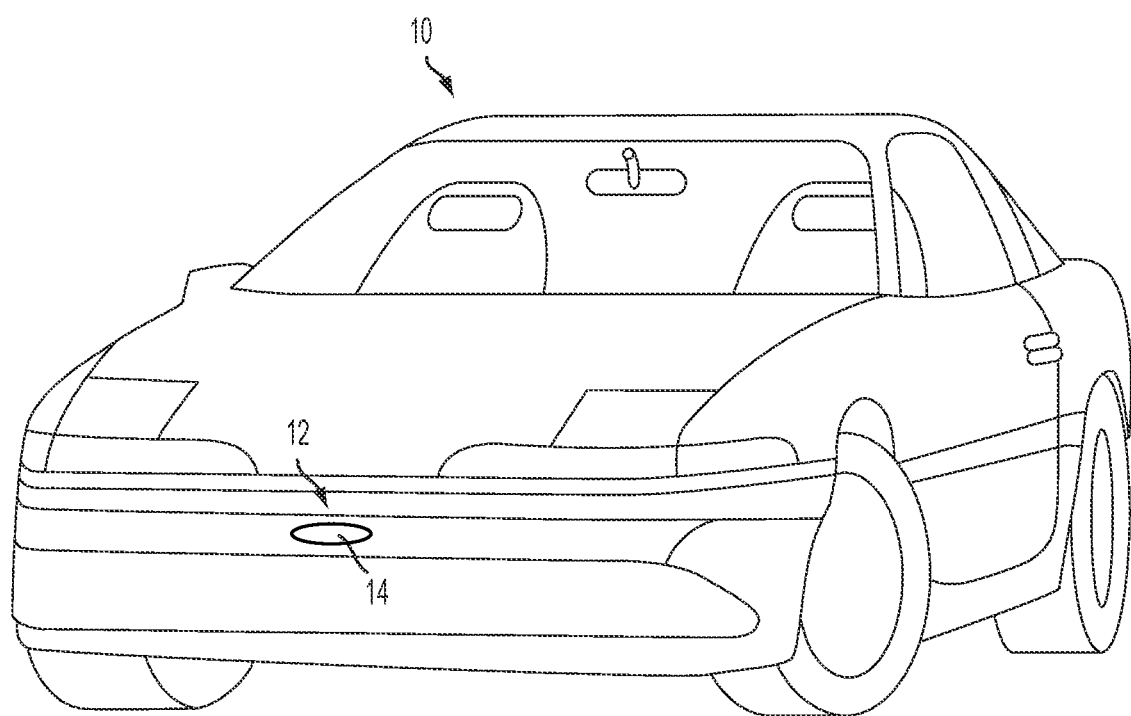
FIG. 1 is a perspective view of a vehicle with a sensing system that incorporates a radar sensor in accordance with the present invention.

A vehicle sensing system, such as a driver assist system, object detection system, parking assist system and/or alert system, operates to capture sensing data exterior of the vehicle and may process the captured data to detect objects or other vehicles at or near the equipped vehicle and in the predicted path of the equipped vehicle, such as to assist a driver of the equipped vehicle in maneuvering the vehicle in a forward or rearward direction or to assist the driver in parking the vehicle in a parking space. The system includes a processor that is operable to receive sensing data from one or more sensors and to provide an output to a control that, responsive to the output, generates an alert or controls an accessory or system of the vehicle, or highlights or overlays an alert on a display screen (that may be displaying video images captured by a single rearward viewing camera or multiple cameras providing forward, side or 360 degree surround views of the area surrounding the vehicle during a reversing or low speed maneuver of the vehicle).

Referring now to the drawings and the illustrative embodiments depicted therein, a vehicle 10 includes an driver assistance system or sensing system 12 that includes at least one LIDAR (Light Detection And Ranging) sensor unit, such as a forward facing LIDAR sensor unit 14 (and the system may optionally include multiple exterior facing sensors, such as multiple exterior facing LIDAR sensors or RADAR sensors or cameras or other sensors, such as a rearward facing sensor at the rear of the vehicle, and a sideward/rearward facing sensor at respective sides of the vehicle), which senses one or more regions exterior of the vehicle. The sensing system 12 includes a control or electronic control unit (ECU) or processor that is operable to process data sensed or captured by the sensor or sensors and may, via processing of the captured data, detect objects or the like that is/are present in the field of sensing of the sensor. The data transfer or signal communication from the sensor to the ECU may comprise any suitable data or communication link, such as a vehicle network bus or the like of the equipped vehicle.

Figure 2:
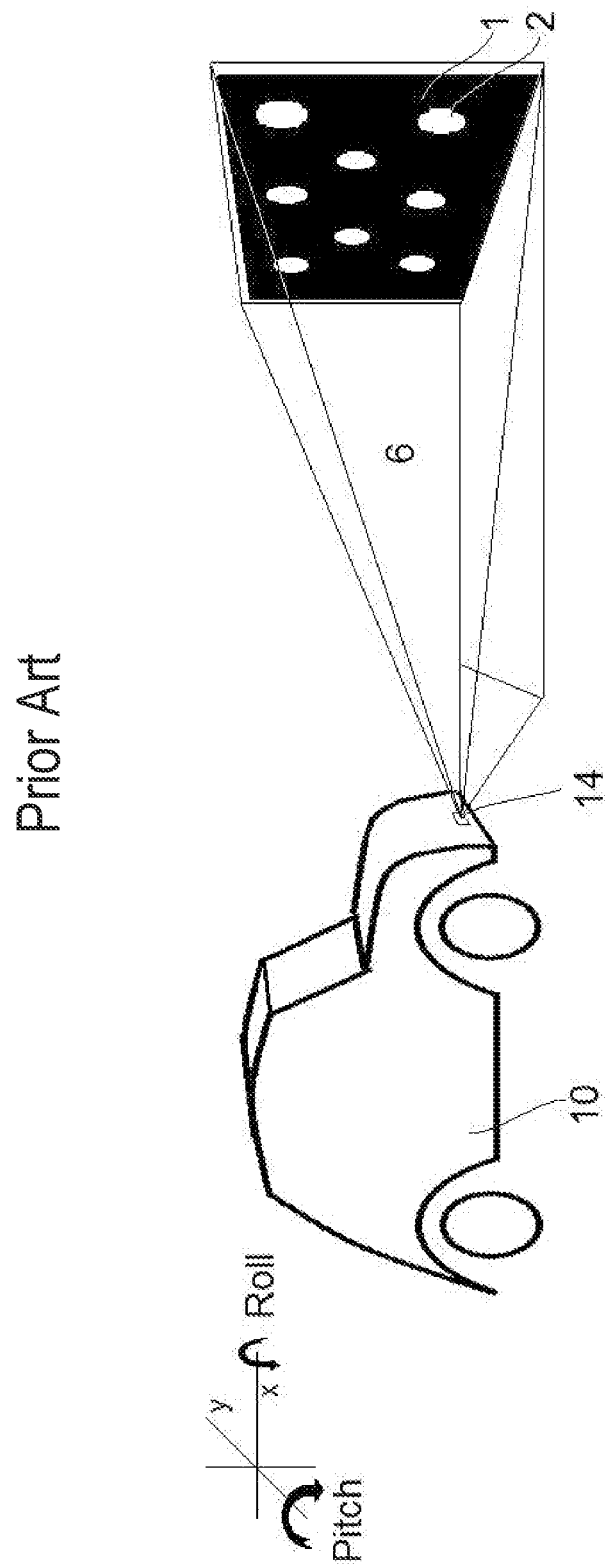
FIG. 2 is perspective view of a vehicle at an end of line calibration region or station, with a vertical target disposed in the field of sensing of the LIDAR sensor of the vehicle.

It is known in customer end of line (EOL) LIDAR sensor calibration to use one two dimensional orthogonal (upright) target 1 having spots or markers 2, which are placed in the field of view or field of sensing (FOV) 6 of a LIDAR sensor of a vehicle so as to be sensed or captured by the LIDAR sensor for calibration, such as shown in FIG. 2. Because the distance to the target is known (the vehicle is stopped at a particular location relative to the upright target), this set up allows the system to calibrate the roll and the pitch angle and the z dimension. Because this set up or configuration is not well suited for calibrating the yaw, the calibration is not fully finished at the time of EOL, and the yaw often gets calibrated past EOL on the road.

Figure 3:
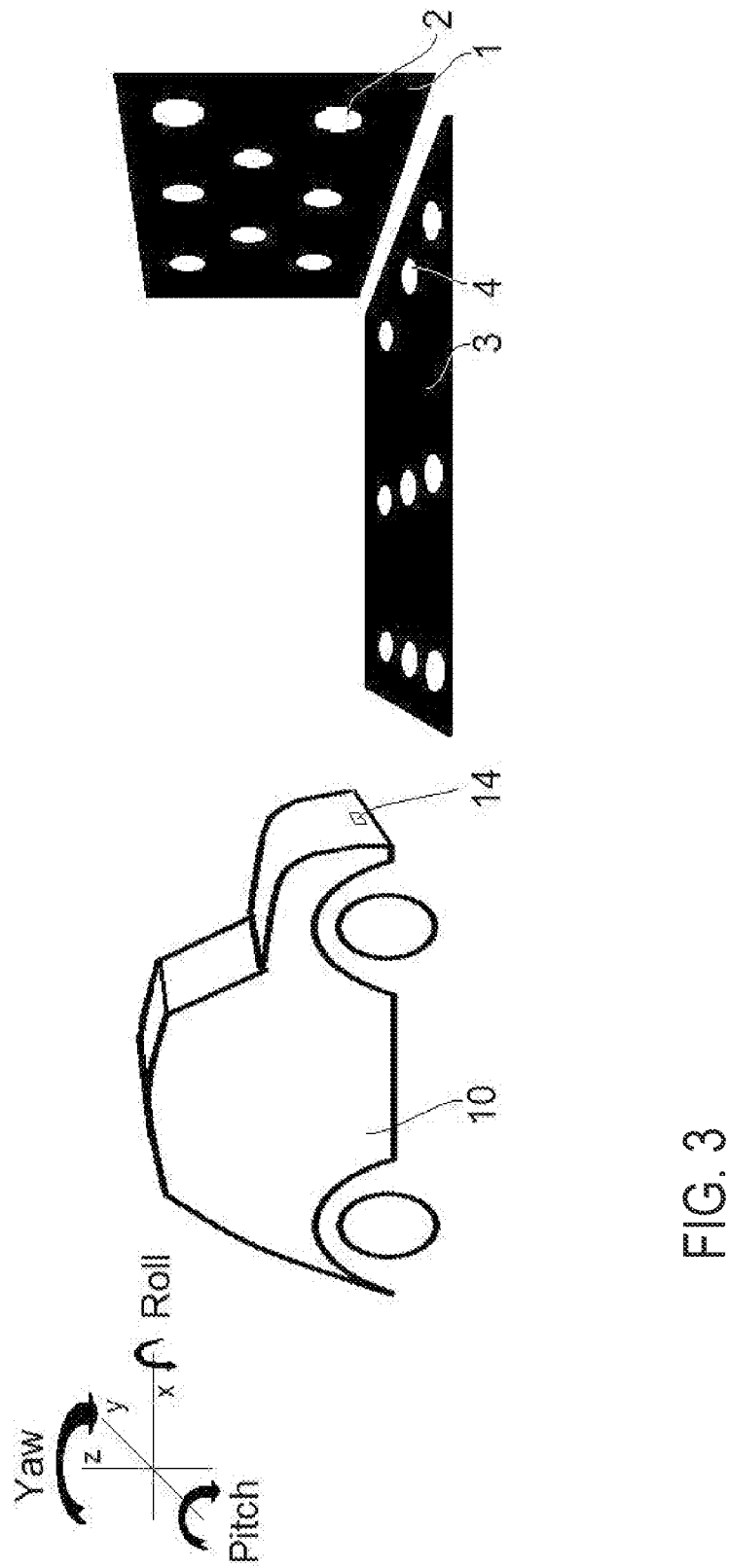
FIG. 3 is a perspective view of a vehicle at an end of line calibration region or station, with a vertical target and a horizontal target disposed in the field of sensing of the LIDAR sensor of the vehicle.

The system of the present invention provides enhanced calibration of the LIDAR sensor and provides for calibration of pitch, roll and yaw. To ease and improve the end of line or EOL LIDAR calibration so that it can get finalized at a customer EOL, and in accordance with the present invention, another target 3 is disposed into the FOV 6 onto the ground plane, adding the third dimension, with the additional target 3 having spots or markers 4 at known reference positions that can be captured by the LIDAR (see FIG. 3). The markers may optionally be made of a material that is highly reflective to the infrared light of the LIDAR such as by using road marking paint with tiny glass grain. This may have another optional property inherent. The ground target 3 may be suitable to be driven over, so that it can be easily applied and does not need to get taken away when the calibrated vehicle 10 is done, different to target 1 (which may have to be placed and removed for each vehicle if it is in the path of travel of the vehicle along the assembly line).

Figure 4:
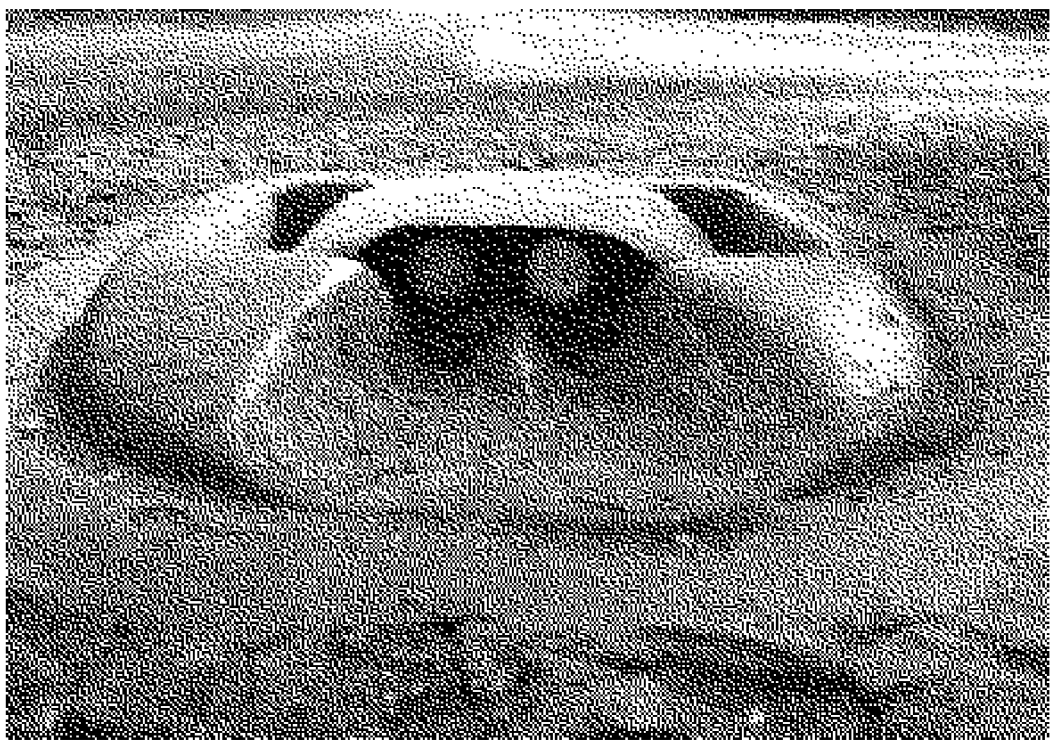
FIG. 4 is a perspective view of a light reflecting element suitable for use in the calibration system of the present invention.
Figure 5:
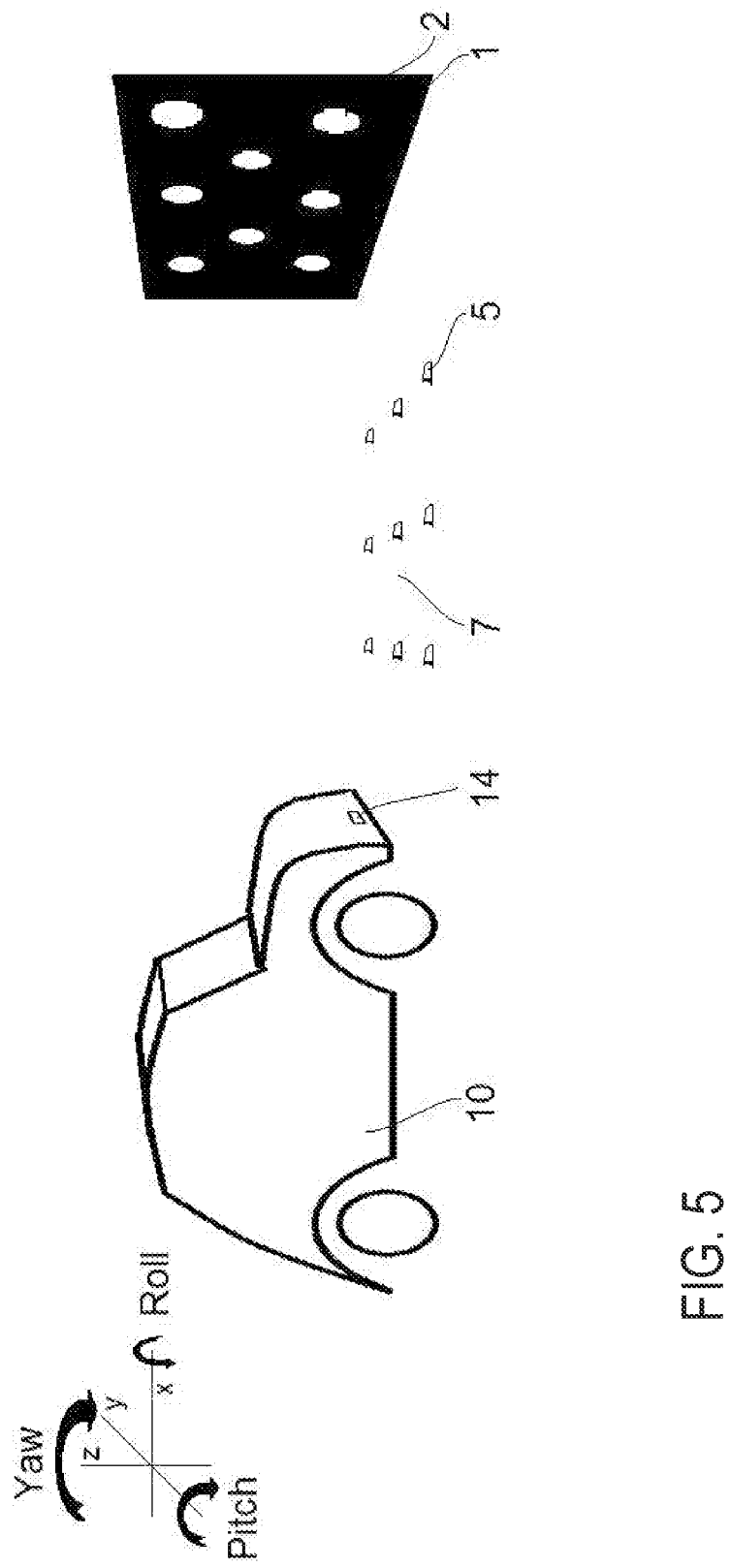
FIG. 5 is a perspective view of a vehicle at an end of line calibration region or station, with a vertical target and a plurality of light reflecting elements disposed at a ground surface in the field of sensing of the LIDAR sensor of the vehicle.
Figure 6:
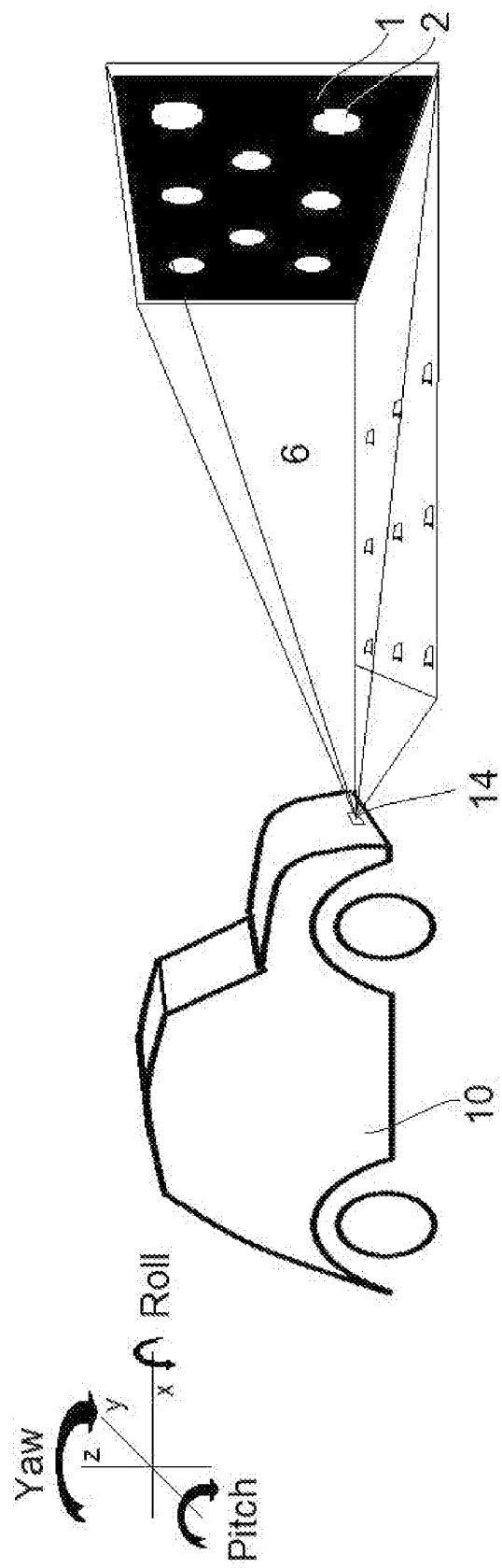
FIG. 6 is a perspective view of a vehicle at an end of line calibration region or station, with a vertical target and a plurality of light reflecting elements disposed at a ground surface, showing the field of sensing of the LIDAR sensor of the vehicle encompassing the vertical target and the plurality of light reflecting elements.

Optionally, another target 3 or target pattern 7 may comprise reflective bot dots 5 disposed at the ground surface and at ground reference points, reflecting to the direction of the vehicle under test's LIDAR instead of reflective paint. A suitable bot dot is shown in FIG. 4, with the bot dots arranged at the ground surface shown in FIGS. 5 and 6. The size of the bot dot's reflections may be chosen according the LIDAR's resolution in the according distance.

Besides providing the possibility of yaw calibration, using a ground target may additionally have the benefit in reducing the FOV required during calibration. During calibration, the LIDAR may scan just on the ground ahead of the vehicle, making the vertical target 1 obsolete. The calibration may be faster and may require less power. FIGS. 1-3, 5 and 6 show examples of a forward vision LIDAR mounted at the bumper region. However, the LIDAR ground target set up in accordance with the present invention may also be used for calibrating vehicle LIDAR sensors that sense rearward or sideward or angular relative to the vehicle.

Thus, the calibration system of the present invention provides enhanced calibration of a LIDAR sensing system of a vehicle at the end of line of the vehicle assembly plant or facility. The system includes a plurality of light reflecting elements disposed at the ground surface at a calibration region of the vehicle assembly facility, such that the light reflecting elements are in the field of sensing of at least one LIDAR sensor of vehicle as the vehicle is moving along the assembly line. When the vehicle is at a predetermined location relative to the light reflecting elements (which may be determined by a sensing system or a marker at the assembly line or any suitable means for determining when the vehicle is at a selected distance from the targets or elements), the LIDAR sensing system of the vehicle captures sensor data and the sensor data is processed by a processor to determine the location of the markers or targets relative to the vehicle and to determine any misalignment of the LIDAR sensor. The calibration system, based on the known location of the light reflecting elements relative to the vehicle of vehicle path, compares the determined locations with the known or expected locations and determines any misalignment (about pitch, roll and yaw axes) of the LIDAR sensor or sensors and calibrates the LIDAR sensing system accordingly. The calibration may comprise an adjustment of processing of sensor data captured by the LIDAR sensor to accommodate the offset or misalignment of the sensor, or the calibration may comprise a shift or physical adjustment of the sensor itself.

The calibration system may also utilize a vertically oriented target with a plurality of markers arranged in a pattern, such that processing of the captured sensor data (based on the known location of the markers relative to the vehicle) further enhances determination of misalignment and thus enhances calibration of the LIDAR sensing system of the vehicle. The calibration system (using only the ground-placed light reflecting elements or optionally also using the vertical markers) is capable of calibrating the LIDAR sensing system for pitch, roll and yaw, and thus the LIDAR sensing system may be fully calibrated at the end of line at the vehicle assembly plant, such that no further calibration is needed on the road or otherwise after the vehicle leaves the assembly plant.

The present invention thus provides a ground surface at the EOL of an assembly line with the surface painted or covered with some material which gives reflections in such a way that a plane can be determined or fitted. Optionally, the light reflecting elements may be used, and may be disposed and arranged at well-defined locations. Because near range distance accuracy with LIDAR is lacking, the system of the present invention does not use distance accuracy but instead uses trigonometry and fitting of places on a surface for estimation. The system thus provides enhanced calibration of the LIDAR sensors of a vehicle all while the vehicle is at the vehicle assembly plant and as the vehicle is passing through the EOL calibration region (where the vehicle may be stopped at a particular location for the sensor calibration or may move slowly through while data is collected and processed to detect the reflecting elements and to determine misalignment of the sensor or sensors).

The system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A calibration system for calibrating a LIDAR sensing system of a vehicle, said calibration system comprising:
  a horizontal target disposed at a horizontal ground surface at an end of line calibration region of a vehicle assembly facility and comprising a plurality of first markers in a first pattern;
  a vertical target disposed at the end of line calibration region and comprising a plurality of second markers arranged in a second pattern;

wherein, when a vehicle equipped with a LIDAR sensing system is positioned at the end of line calibration region, the plurality of first markers and the plurality of second markers are in the field of sensing of a LIDAR sensor of the LIDAR sensing system of the vehicle;

wherein, responsive to processing of data captured by the LIDAR sensor with the vehicle positioned at the end of line calibration region, said calibration system determines the locations of the plurality of first markers and the plurality of second markers relative to the vehicle; and wherein, responsive at least in part to the determined locations of the plurality of first markers and the plurality of second markers relative to the vehicle, said calibration system determines misalignment of a roll, a pitch, and a yaw of the LIDAR sensor and calibrates the LIDAR sensing system to accommodate the determined misalignment.

2. The calibration system of claim 1, wherein the LIDAR sensor is disposed at a front portion of the vehicle and senses forward of the equipped vehicle.

3. The calibration system of claim 1, wherein the first pattern is different than the second pattern.

4. The calibration system of claim 1, wherein data is captured by the LIDAR sensor of the vehicle when the vehicle is located at a predetermined location relative to the plurality of first markers and the plurality of second markers.

5. The calibration system of claim 1, wherein the plurality of first markers are spaced apart at the horizontal ground surface.

6. The calibration system of claim 5, wherein the plurality of first markers are permanently disposed at the horizontal ground surface such that the vehicle is moved over the plurality first of markers as the vehicle moves along the assembly line.

7. The calibration system of claim 1, wherein the plurality of first markers are light reflective elements at known reference positions of the horizontal target that is disposed at the horizontal ground surface.

8. The calibration system of claim 7, wherein the horizontal target is removably disposed at the horizontal ground surface.

9. The calibration system of claim 1, wherein the plurality of first markers comprise reflective paint disposed at the horizontal ground surface.

10. The calibration system of claim 1, wherein the plurality of first markers comprise reflecting elements disposed at the horizontal ground surface and angled toward the vehicle so as to enhance detection of the plurality of first markers by the LIDAR sensing system.

11. A calibration system for calibrating a LIDAR sensing system of a vehicle, said calibration system comprising:
a horizontal target disposed at a horizontal ground surface at an end of line calibration region of a vehicle assembly facility and comprising a plurality of first markers in a first pattern;
a vertical target disposed at the end of line calibration region and comprising a plurality of second markers arranged in a second pattern;
wherein, when a vehicle equipped with a LIDAR sensing system is positioned at the end of line calibration region, the plurality of first markers and the plurality of second markers are in the field of sensing of a LIDAR sensor of the LIDAR sensing system of the vehicle;
wherein the LIDAR sensor is disposed at a front portion of the vehicle and senses forward of the equipped vehicle;
wherein, responsive to processing of data captured by the LIDAR sensor with the vehicle positioned at the end of line calibration region, said calibration system determines the locations of the plurality of first markers and the plurality of second markers relative to the vehicle;
wherein, responsive at least in part to the determined locations of the plurality of first markers and the plurality of second markers relative to the vehicle, said calibration system determines misalignment of a roll, a pitch, and a yaw of the LIDAR sensor and calibrates the LIDAR sensing system to accommodate the determined misalignment; and
wherein the first pattern and the second pattern are different.

12. The calibration system of claim 11, wherein data is captured by the LIDAR sensor of the vehicle when the vehicle is located at a predetermined location relative to the plurality of first markers and the plurality of second markers.

13. The calibration system of claim 11, wherein the plurality of first markers are spaced apart at the horizontal ground surface.

14. The calibration system of claim 11, wherein the plurality of first markers are light reflective elements at known reference positions of the horizontal target that is disposed at the horizontal ground surface.

15. A calibration system for calibrating a LIDAR sensing system of a vehicle, said calibration system comprising:
a horizontal target disposed at a horizontal ground surface at an end of line calibration region of a vehicle assembly facility and comprising a plurality of first markers in a first pattern;
a vertical target disposed at the end of line calibration region and comprising a plurality of second markers arranged in a second pattern;
wherein, when a vehicle equipped with a LIDAR sensing system is positioned at the end of line calibration region, the plurality of first markers and the plurality of second markers are in the field of sensing of a LIDAR sensor of the LIDAR sensing system of the vehicle;
wherein the plurality of first markers comprise light reflecting elements disposed at the horizontal ground surface and angled toward the vehicle so as to enhance detection of the plurality of first markers by the LIDAR sensing system;
wherein the plurality of second markers comprise light reflecting elements so as to enhance detection of the plurality of second markers by the LIDAR sensing system;
wherein, responsive to processing of data captured by the LIDAR sensor with the vehicle positioned at the end of line calibration region, said calibration system determines the locations of the plurality of first markers and the plurality of second markers relative to the vehicle; and
wherein, responsive at least in part to the determined locations of the plurality of first markers and the plurality of second markers relative to the vehicle, said calibration system determines misalignment of a roll, a pitch, and a yaw of the LIDAR sensor and calibrates the LIDAR sensing system to accommodate the determined misalignment.

16. The calibration system of claim 15, wherein the LIDAR sensor is disposed at a front portion of the vehicle and senses forward of the equipped vehicle.

17. The calibration system of claim 15, wherein the first pattern and the second pattern are different.

18. The calibration system of claim 15, wherein data is captured by the LIDAR sensor of the vehicle when the vehicle is located at a predetermined location relative to the plurality of first markers and the plurality of second markers.

19. The calibration system of claim 15, wherein the plurality of second markers are spaced apart.

\* \* \* \* \*